(12) United States Patent
Pagan

(10) Patent No.: US 7,768,514 B2
(45) Date of Patent: Aug. 3, 2010

(54) SIMULTANEOUS VIEW AND POINT NAVIGATION

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 11/612,951

(22) Filed: Dec. 19, 2006

(65) Prior Publication Data

US 2008/0143722 A1 Jun. 19, 2008

(51) Int. Cl.
*G06T 15/00* (2006.01)

(52) U.S. Cl. ............... 345/473; 345/156; 345/164; 345/166

(58) Field of Classification Search ........... 345/419, 345/156, 163, 164, 165, 166, 167, 473, 474, 345/475
See application file for complete search history.

(56) References Cited

U.S. PATENT DOCUMENTS

| | | | |
|---|---|---|---|
| 5,771,038 A | 6/1998 | Wang | |
| 5,847,709 A * | 12/1998 | Card et al. | 715/850 |
| 6,361,321 B1 * | 3/2002 | Huston et al. | 434/69 |
| 6,480,184 B1 | 11/2002 | Price | |
| 6,727,889 B2 | 4/2004 | Shaw | |
| 6,822,638 B2 | 11/2004 | Dobies et al. | |
| 6,890,077 B2 | 5/2005 | Dunn | |
| 2003/0222924 A1 | 12/2003 | Baron | |

* cited by examiner

*Primary Examiner*—Phu Nguyen
(74) *Attorney, Agent, or Firm*—Cynthia G. Seal, Esq.; Steven M. Greenberg, Esq.; Carey, Rodriguez, Greenberg & Paul, LLP

(57) ABSTRACT

Embodiments of the invention provide a method, system and computer program product for simultaneous view and point navigation. In a first embodiment of the invention, a single virtual environment interaction method can include maintaining first and second independent views corresponding to respectively different geometric planes in a single virtual environment, such as a flight simulator, first-person or third-person shooter game or avatar-driven adventure game. The method also can include independently changing the first view responsive to a first input directive from a first input device while concurrently changing the second view responsive to a second input directive from a second input device. Thereafter, the method further can include modifying a point of interest in one of the views responsive to a third input directive from one of the first and second input devices. Optionally, the devices can include an under-mouse sensor and trackpoint included as part of a dual-pointer mouse.

16 Claims, 3 Drawing Sheets

SIMULTANEOUS VIEW AND POINT NAVIGATION

BACKGROUND OF THE INVENTION

1. Field of the Invention

The present invention relates to the field of virtual environments, and more particularly to simultaneous viewing and control of different geographic planes in a virtual environment.

2. Description of the Related Art

Dramatic advances in graphic display and high-end computing have made it possible to transform billions of bits of data into interactive, three-dimensional images that can be manipulated in real time. Virtual Environments refer to all the display and feedback devices that, collectively, make this transformation possible. The mouse and keyboard are popular input devices that allow a user to interact in a virtual environment. Alternative input devices include a trackball, touchpad, pointing stick, wands and gloves.

The flight simulator first developed for military purposes represents one of the most influential antecedents of virtual environments. In military grade flight simulation systems, a combination of software, hardware, and motion-control platforms enable pilots to navigate through highly detailed virtual worlds. An integral component of flight simulation is the out-of-the-window visual scene. Over the past several decades, virtual environments, once the privilege only of the most advanced and well-funded organizations, now have become widely available at low cost to the common video gamer and personal computer user. Today, flight simulators in addition to first person shooter and avatar-driven amusement games have found a home in the personal computing environment as well as in the proprietary video gaming environment.

A combination of mouse input and keyboard input provide a popular way to play first-person shooter games and third-person shooter games alike. The first-person shooter game represents a genre of computer and video games in which the player (avatar) is immersed in a virtual environment viewed from the first-person perspective. This perspective is meant to give the player the feeling of virtually "being there", and allows the player to focus on aiming. Likewise, a third-person shoot game provides an "over the shoulder" view of the actions of an avatar similarly providing a feeling of virtually "being there". Most modern first-person and third-person shooters utilize a combination of QWERTY keyboard features and mouse features as a means of controlling and navigating the game.

Typically, in controlling an avatar in a first-person shooter environment, one hand of the user operates the mouse used for "free look", which allows the player to aim and turn the player's view horizontally and vertically. The primary mouse button is used for the main "fire" function, with any additional buttons on the mouse performing other actions such as secondary fire functions. On the keyboard, keys such as W, A, S, D, provide movement forwards, backwards, and side-to-side (often known as "strafing" among players) left and right. Other nearby keys perform additional functions such as jumping, picking up and dropping weapons, to name only a few additional functions.

In the conventional first-person and third-person shooter, navigation is provided in three dimensions, and point of view is provided in three dimensions through the "free look" or "mouse look" operation. The focal point of interest for shooting (the "cross hairs"), however, remains inexorably tied to the existing views due to use of the mouse and selected portions of the keyboard already having been tied to the navigation view and free look. Of course, many other portions of the keyboard remain available to manage point of focus, however, gamers are loathe to repositioning their hands away from the mouse and keyboard when gaming in a virtual environment.

BRIEF SUMMARY OF THE INVENTION

Embodiments of the invention address deficiencies of the art in respect to enhanced navigation through a virtual environment and provide a novel and non-obvious method, system and computer program product for simultaneous view and point navigation. In a first embodiment of the invention, a single virtual environment interaction method can be provided. The method can include maintaining first and second independent views corresponding to respectively different geometric planes in a single virtual environment, such as a flight simulator, first-person or third-person shooter game or avatar-driven adventure game.

The first view can be independently changed responsive to a first input directive from a first input device while the second view can be concurrently changed responsive to a second input directive from a second input device. Importantly, a focal point of interest in one of the views can be concurrently modified responsive to a third input directive from one of the first and second input devices. For instance, the focal point of interest in the second view can be concurrently modified responsive to a trackpoint input from a dual-pointer mouse, while the first view is changed responsive to an under-mouse input from the dual-pointer mouse.

In another embodiment of the invention, a simultaneous view and point navigation data processing system can be provided. The system can include first and second input devices each coupled to a single host computing platform configured to support interactions with a virtual environment and simultaneous viewpoint control logic disposed in the single host computing platform. The logic can include program code enabled to independently change a first view to a first geometric plane in the virtual environment responsive to a first input directive from the first input device while concurrently changing a second view to a second geometric plane in the virtual environment responsive to a second input directive from the second input device and to modify a point of interest in one of the views responsive to a third input directive from one of the first and second input devices.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention is a method, system and computer program product for simultaneous point and view navigation in a virtual environment. In accordance with an embodiment of the invention, different views corresponding to different geometric planes can be controlled independently and simultaneously in a virtual environment while the point of focus in one of the views can be managed using an input device such as a dual-pointer device concurrently used to manage navigation in one of the views. In this way, end users interacting with a single virtual environment can enjoy enhanced navigational performance through different input schemes disposed on a dual pointer device controlling different geometric planes.

Figure 1:
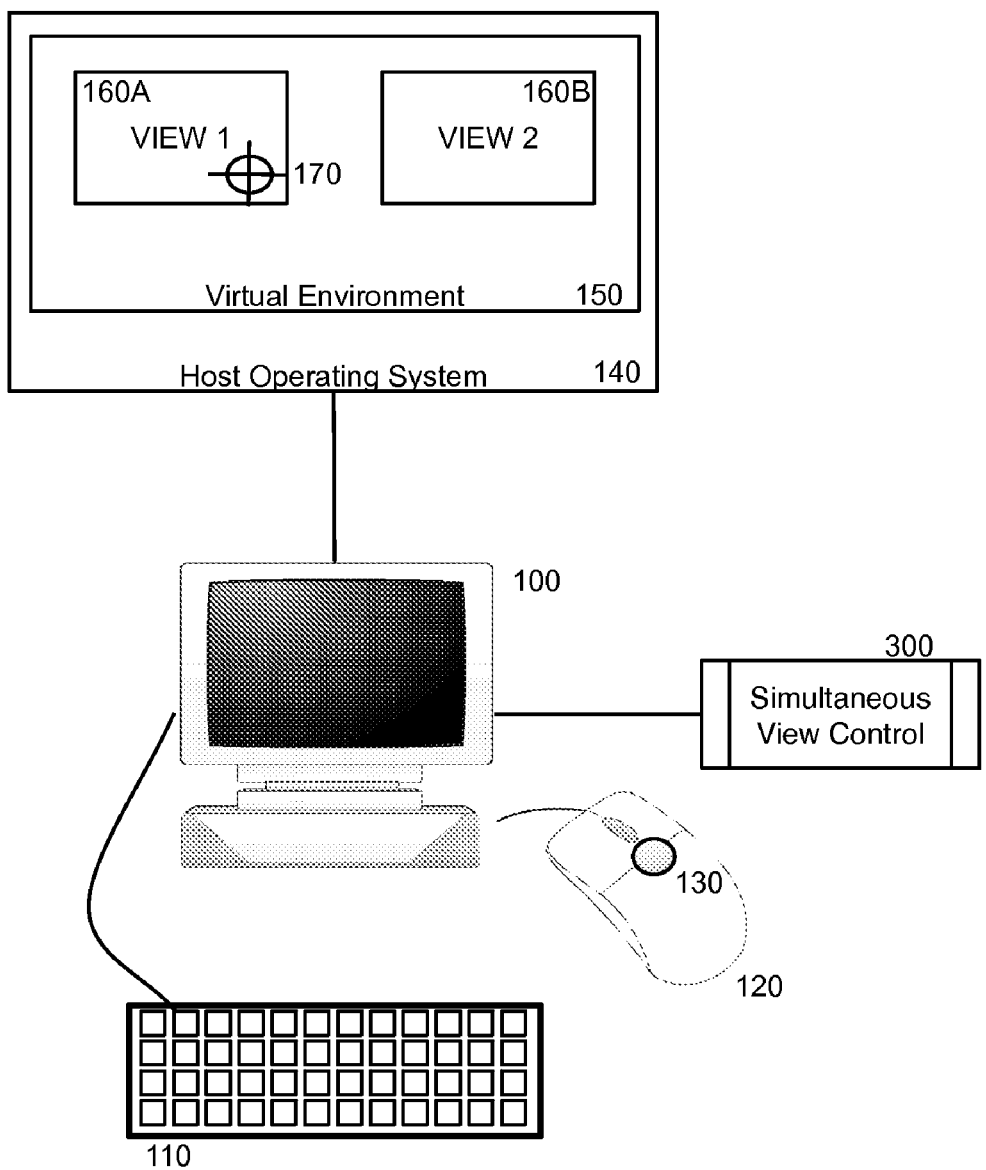
FIG. 1 is schematic illustration of a simultaneous view and point navigation system.

In further illustration, FIG. 1 is a schematic illustration of a simultaneous view and point navigation system in a virtual environment. The system can include a host computing platform 100 supporting the operation of a host operating system 140. The host computing platform 100 can include a power source, a central processing unit (CPU), dynamic and static memory components, fixed storage and supporting circuitry suitable for supporting personal computing activities including the execution of one or more computing applications in the host operating system 140. In particular, the host operating system 140 can manage the execution of an application providing a virtual environment 150, for example a flight simulator, a first person shooter game, or an avatar-driven adventure game.

Notably, the virtual environment 150 can include multiple different views 160A, 160B for correspondingly different geometric planes in the virtual environment 150. For instance, one of the views 160A can provide a first-person frontal view of the landscape of the virtual environment 150, while a second one of the views 160B can provide a first-person rear view of the landscape of the virtual environment 150. Each of the views 160A, 160B can be configured to be manipulated separately, however, through separate input directives received from correspondingly different input devices 110, 120, 130 for instance a keyboard input device 110 and a dual-pointer mouse including an under-mouse 120 and a trackpoint 130. To facilitate the manipulation of the different views 160A, 160B responsive to input directives from the different input devices 110, 120, 130 simultaneous view control logic 300 can be coupled to the host computing platform 100.

The simultaneous view control logic 300 can include program code enabled to receive input directives from the different input devices 110, 120, 130. Input directives from each of the different input devices 110, 120, 130 can be associated with correspondingly different ones of the views 160A, 160B. At least one of the input directives received from one of the input devices 120 can be used to control one of the views 160A, 160B, while another one of the input directives received from another input device 130 can be used to control a focal point of interest 170 in one of the views 160A, 160B.

In this regard, as an example, an input directive received through the under-mouse 120 can be used to control a modification of the view 160B, whereas an input received through the trackpoint 130 can be used to aim the focal point of interest 170 of the view 160A without affecting the navigation of the view 160B. In this way, the end user can control the focal point of interest 170 and the views 160A, 160B without changing hand positions on any of the input devices 110, 120, 130.

Figure 2:
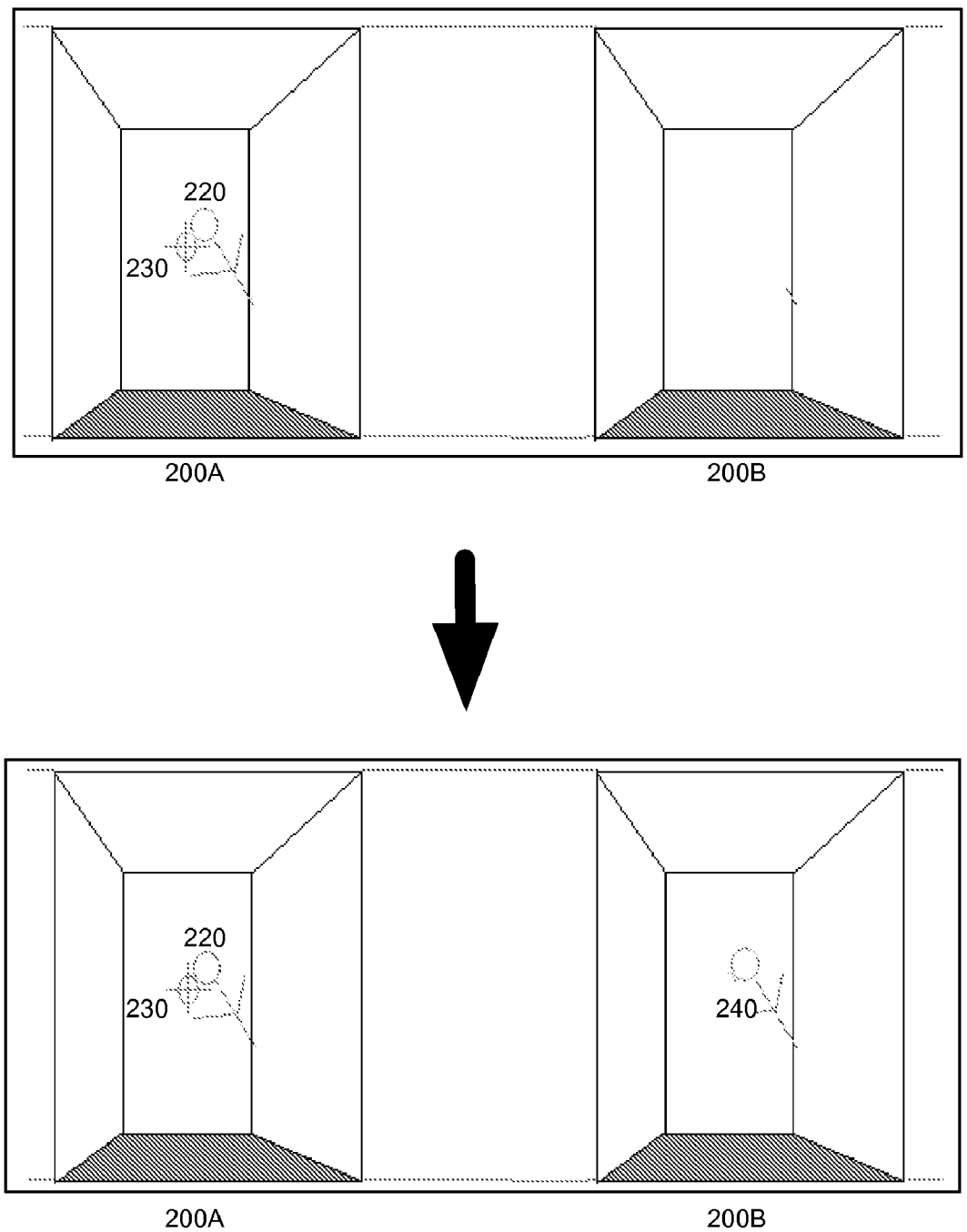
FIG. 2 is a pictorial illustration of a user interface to a virtual environment in which separate simultaneously applied input directives navigate correspondingly separate views of the single virtual environment while providing point of focus in one of the views; and, FIG. 3 is a flow chart illustrating a process for a simultaneous view and point navigation system.

In further illustration, FIG. 2 is a pictorial illustration of a user interface to a virtual environment in which separate simultaneously applied input directives navigate correspondingly separate navigational views of the single virtual environment. The virtual environment, as shown in the pictorial illustration of FIG. 2, can include an environment generated within a first-person or third-person shooter game. In a typical first-person or third-person shooter game, the user can only shoot at what is directly centered in one view, thus the user would typically only have control in one geometrical plane, such as primary view 200A.

However, as shown in FIG. 2, the user interface can provide not only a primary view 200A, but also secondary view 200B, for instance a free look view also known as a mouse look view. In this regard, the different views 200A, 200B can include separate corridors in a first person or third-person shooter game. In the present invention, the user can separately manipulate focus in the primary view 200A using input directives from an input device while manipulating the secondary view 200B using different input directives from the same input device. Specifically, the user can engage in control of the first view 200A using keyboard navigation strokes, while engaging in control of the second view 200B using an under-mouse of a dual-pointer mouse, yet further while aiming with the first-person focal point of interest 230 on the primary target 220 using the trackpoint on the dual-pointer mouse. As such, the user will know when in the secondary view 200B a second target 240 appears without losing aim on the primary target 220 in the primary view 200A.

Figure 3:
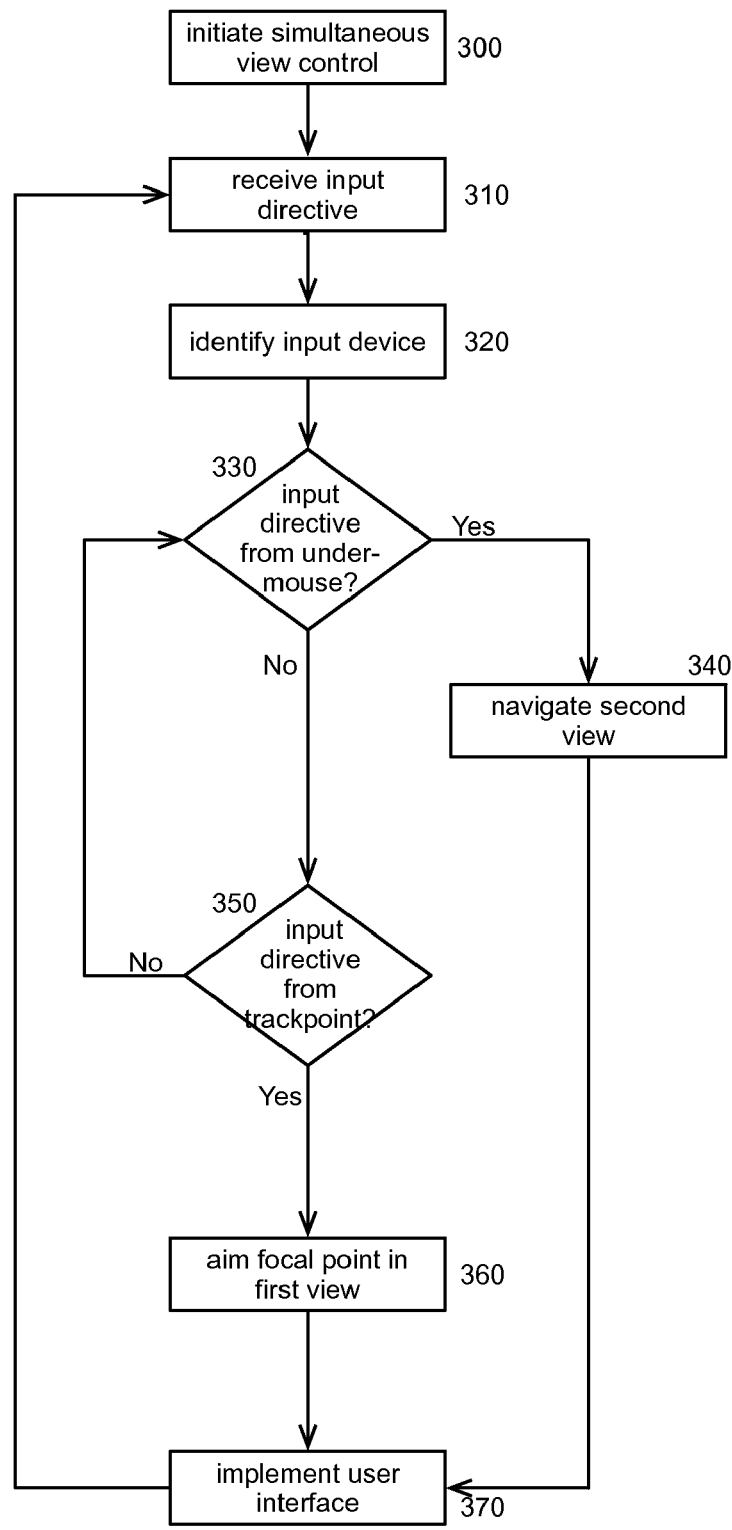

In yet further illustration of the simultaneous view control 300, FIG. 3 is a flow chart illustrating a process for a simultaneous view and point navigation system. In block 310 the host operating system receives an input directive from an input device. Then in block 320, the input device is identified. In decision block 330, if the input directive is from the under-mouse sensor then in block 340 the second view can be navigated according to the input directive and the user interface can be refreshed in block 370. Otherwise, in decision block 330, if the input directive is not from an undermouse, but in decision block 350 if it is determined that the input directive is from the trackpoint, then in block 360 the focal point of interest of the first view can be aimed and the user interface can be refreshed in block 370.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A single virtual environment interaction method executing on a computer system, the method comprising:
   simultaneously maintaining first and second independent views in memory, the first and second independent views corresponding to respectively different geometric planes in a single virtual environment;
   independently changing the first view responsive to a first input directive from a first human input device while concurrently changing the second view responsive to a second input directive from a human second input device; and
   modifying a focal point of interest in one of the views responsive to a third input directive from one of the first and second human input devices, wherein
   a first geometric plane corresponds to the first view,
   a second geometric plane corresponds to the second view, and
   the independent changing of the first and second views changes the relative orientation of the first geometric plane to the second geometric plane.

2. The method of claim 1, wherein the modifying comprises:
   establishing a focal point of interest in the first view; and
   aiming the focal point of interest with the third input directive while changing the second view through the second input directive, wherein
   the third input and the second input directives are received in the first human input device.

3. The method of claim 2, wherein
   the focal point of interest is aimed with a trackpoint input directive while the second view is changed through an under-mouse input directive, and
   the trackpoint input and the under-mouse input directives are received in a dual-pointer mouse.

4. The method of claim 2, wherein
   the focal point of interest is aimed with an under-mouse directive while the second view is changed through an trackpoint directive, and
   the trackpoint input and the under-mouse input directives are received in a dual-pointer mouse.

5. A simultaneous view and point navigation data processing system comprising:
   a host computing platform including memory and configured to support interactions within a virtual environment;
   first and second input devices each coupled to the single host computing platform; and
   simultaneous viewpoint control logic disposed in the single host computing platform, the logic comprising program code configured to perform the operations of
   simultaneously maintain first and second independent views in the memory, the first and second independent views corresponding to respectively different geometric planes in a single virtual environment,
   independently change the first view responsive to a first input directive from the first input device while concurrently changing the second view responsive to a second input directive from the second input device, and
   modify a focal point of interest in one of the views responsive to a third input directive from one of the first and second input devices, wherein
   a first geometric plane corresponds to the first view,
   a second geometric plane corresponds to the second view, and
   the independent changing of the first and second views changes the relative orientation of the first geometric plane to the second geometric plane.

6. The system of claim 5, wherein
the first and second input devices comprise an under-mouse sensor and a trackpoint both incorporated in a dual-pointer mouse.

7. The system of claim 5, wherein
the virtual environment is a first-person shooter game.

8. The system of claim 7, wherein
the first geometric plane is a first corridor, and
the second geometric plane is a different corridor.

9. The system of claim 5, wherein
the virtual environment is a third-person shooter game.

10. The system of claim 9, wherein
the first geometric plane is a first corridor, and
the second geometric plane is a different corridor.

11. The system of claim 5, wherein
the virtual environment is a flight simulator.

12. The system of claim 5, wherein
the virtual environment is an avatar-based game.

13. A computer-readable storage medium having stored therein computer usable program code for simultaneous view and point navigation in a virtual environment, the computer usable program code, which when executed by a computer hardware system, causes the computer hardware system to perform:
   simultaneously maintaining first and second independent views corresponding to respectively different geometric planes in a single virtual environment;
   independently changing the first view responsive to a first input directive from a first input device while concurrently changing the second view responsive to a second input directive from a second input device;
   modifying a focal point of interest in one of the views responsive to a third input directive from one of the first and second input devices, wherein
   a first geometric plane corresponds to the first view,
   a second geometric plane corresponds to the second view, and the independent changing of the first and second views changes the relative orientation of the first geometric plane to the second geometric plane.

14. The computer-readable storage medium of claim 13, wherein the modifying comprises:

establishing a focal point of interest in the first view; and aiming the focal point of interest with the third input directive while changing the second view through the second input directive, wherein both directives are received in the first input device.

15. The computer-readable storage medium of claim 14, wherein the focal point of interest is aimed with a trackpoint input directive while the second view is changed through an under-mouse input directive, and the trackpoint input and the under-mouse input directives are received in a dual-pointer mouse.

16. The computer-readable storage medium of claim 14, wherein the focal point of interest is aimed with an under-mouse directive while the second view is changed through an trackpoint directive, and the trackpoint input and the under-mouse input directives are received in a dual-pointer mouse.

* * * * *